Jan. 11, 1927.
J. P. SPANG
1,614,047
MEAT TENDERER
Filed Feb. 1, 1926  2 Sheets-Sheet 1
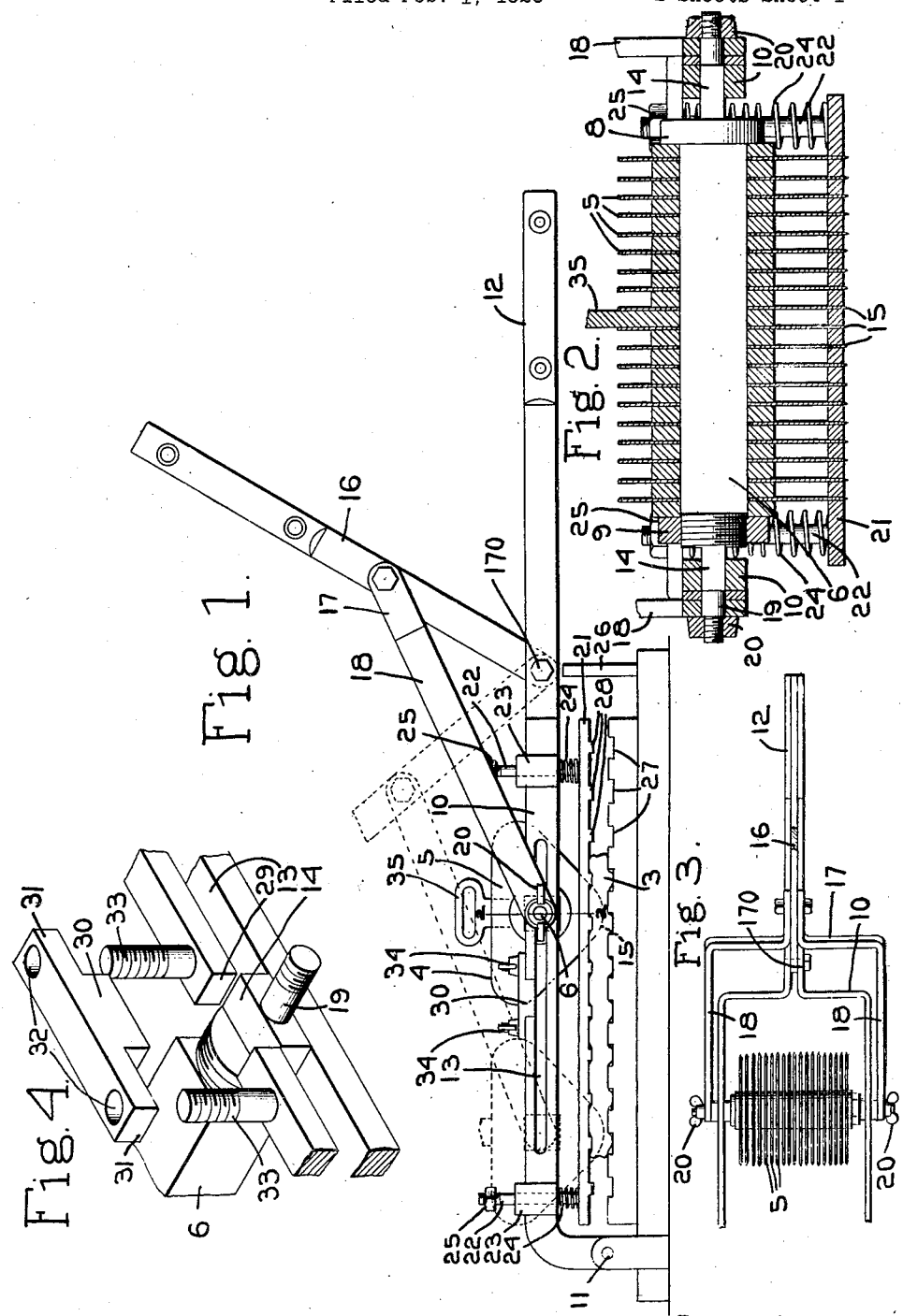
Inventor.
Joseph P. Spang
by Heard Smith & Tennant
Attys.

Jan. 11, 1927.

J. P. SPANG 1,614,047

MEAT TENDERER

Filed Feb. 1, 1926    2 Sheets-Sheet 2

Inventor
Joseph P. Spang
by Heard Smith Tennant
Attys.

Patented Jan. 11, 1927.

1,614,047

UNITED STATES PATENT OFFICE.

JOSEPH P. SPANG, OF QUINCY, MASSACHUSETTS.

MEAT TENDERER.

Application filed February 1, 1926. Serial No. 85,146.

In my Patent No. 1,570,792, January 26, 1926, I have illustrated and described a meat tenderer comprising a bed, a knife carrier movable toward and from the bed, cutting knives carried by the knife carrier and means to move the knives relative to the carrier thereby to slice the meat.

In using a device of this type it is essential that the knives should be kept clean and one of the objects of my present invention is to provide a novel construction by which the cleaning of the knives may be facilitated. This is accomplished by so constructing the knife carrier that the gang of knives can be readily removed therefrom when it is desired to clean them.

Other objects of the invention are to provide a novel construction by which the meat will be more firmly held while it is being tendered and also to generally improve the meat tenderer as will be more fully hereinafter set forth.

In order to give an understanding of the invention I have illustrated in the drawings some selected embodiments thereof which will now be described after which the novel features will be pointed out in the appended claims.

Fig. 1 is a side view of a meat tenderer embodying my invention;

Fig. 2 is a section on the line 2—2, Fig. 1;

Fig. 3 is a top plan view of a portion of the knife carrier showing the knives therein;

Fig. 4 is a fragmentary perspective view illustrating the construction which permits the ready removal of the knives from the knife carrier;

Figure 5:
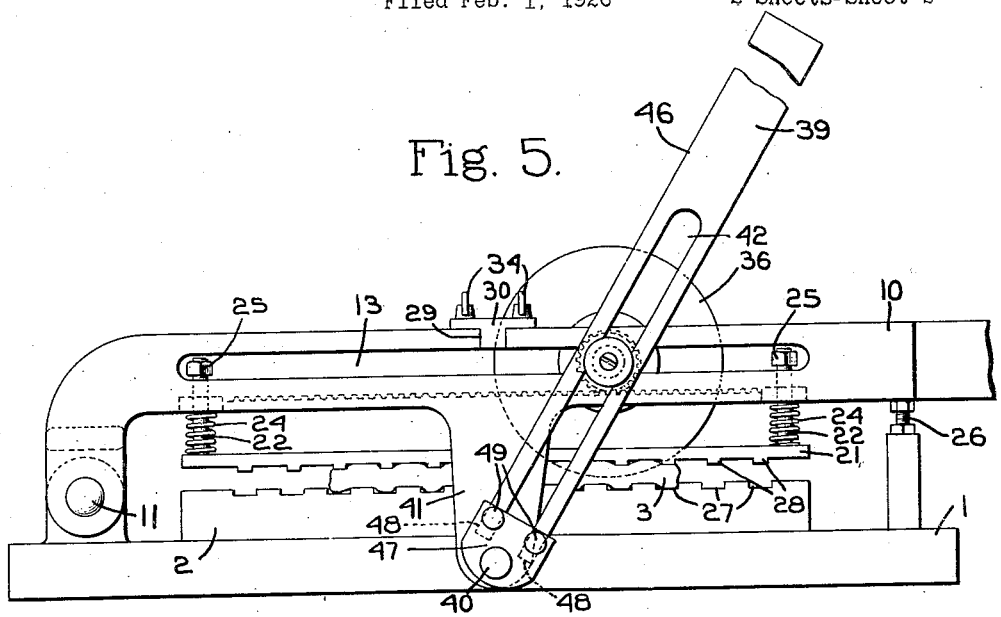
Fig. 5 is a side view of a different embodiment of the invention.

The device shown in Fig. 1 comprises the base portion 1 adapted to rest on a table or other support and having a bed 2 on which the steak or other piece of meat 3 to be tendered is placed.

The knives which are used are preferably in the form of a gang, the gang of knives being indicated generally at 4. These comprise a plurality of knives 5 each having a triangular shape and a cutting edge 15, said knives being mounted on a supporting shaft 6, the knives being separated from each other by spacing members 7. The shaft 6 is shown as a non-circular shaft and each knife has a corresponding non-circular hole through which the shaft extends so that the knives are prevented from turning movement on the shaft.

The shaft 6 is provided at one end with a collar 8 and has a clamping nut 9 screwed on the other end whereby the knives 5 and spacers 7 are firmly clamped in place. The knife is supported in a knife carrier indicated generally at 10 and which is in the form of a yoke member having its arms pivoted to the base as shown at 11. This knife carrier is provided at its end with a handle portion 12 by which it may be swung about the pivots 11. The knife is slidably mounted in the knife carrier as shown in my above-mentioned patent and for this purpose each arm of the knife carrier 10 is provided with a slot 13 and the ends of the shaft 6 are formed with flat sided portions 14 which slide in the grooves 13. The engagement of the flat portions 14 of the shaft in the grooves 13 prevents the shaft from turning as will be obvious.

For moving the knife carrier back and forth in the slots I have provided a knife-moving member in the form of a lever 16 which is pivoted at 170 to the handle portion of the knife carrier, said actuating lever 16 being connected by a yoke member 17 to the shaft 6 of the gang of knives. The member 17 is a forked member and the arms 18 thereof are provided with apertures through which the cylindrical ends 19 of the shaft 6 extend, said arms 18 being retained in position by wing nuts 20. The knife carrier also has associated therewith a combined stripper and clamping plate 21 which is provided with slits through which the knives extend and which are yieldingly attached to the knife carrier. Said stripper plate is provided with posts 22 rising therefrom which extend through guiding ears or bosses 23 on the knife carrier, each post being surrounded by a spring 24 which is interposed between the stripper plate 21 and the corresponding boss 23, and each post also having a nut or collar 25 on its upper end which limits the downward movement of the stripper plate due to the expanding action of the springs 24.

The manner in which the device is used will be apparent from the foregoing. The operator will first swing the carrier frame backwardly about the pivot 11 to permit a steak 3 or other piece of meat to be placed on the bed 2 and then the carrier is swung downwardly into the position shown in Fig. 1 until the handle portion thereof strikes the adjustable stop 26. As the combined stripper plate 21 and clamping plate engages the meat the springs 24 will be compressed as shown and thus the meat will be held under yielding pressure. While the operator is holding the handle 12 down in the full line position shown in Fig. 1 with one hand he will with the other manipulate the lever 16 swinging it from the full to the dotted line position and vice versa, this movement operating to draw the cutting edges 15 of the knives through the meat thereby slitting it.

The adjustable stop 26 is so regulated that the knives will cut the meat to any desired depth.

The employment of the triangular-shaped knives is an advantage because the cutting edge is in the nature of a rounded point which will be more effective in slitting the meat than an elongated cutting edge such as shown in my above-mentioned patent.

In order to prevent the meat from slipping and to hold it firmly while the slitting operation is in progress I propose to make the top face of the bed 2 with transverse grooves 27 and to make the under face of the combined clamping and stripping plate 21 with transverse ribs 28 which are in alignment with the grooves. The ribs are somewhat narrower than the grooves and when a slice of meat is clamped between the bed and the clamping plate 21 the meat will be crowded into the grooves 27 by the ribs 28 and thus a firm hold on the meat will be obtained which will prevent any slippage thereof.

In order to facilitate the cleaning of the knives after they have been in use I have provided a novel construction by which the gang of knives can be rapidly removed from the knife carrier. The knife carrier is cut away on each side as shown at 29 to form an opening leading into the slots 13, which opening 29 is of sufficient size to permit the flattened portions 14 of the knife shaft to pass therethrough. Each opening 29 is normally closed by a removable block 30 which is provided with wings 31 that overlie the side arm of the carrier and are provided with openings 32 to receive the clamping studs 33 rising from the arm of the carrier.

34 are wing nuts which screw onto the studs 33 and by which the block 30 is retained in place. When each block 30 is in position the slots 13 are closed slots but by removing the wing nuts 34 the blocks 30 may be removed as shown in Fig. 4. This permits the shaft 6 to be removed from the carrier.

By removing the wing nuts 20 the arms 18 of the member 17 may be withdrawn from the ends 19 of the knife shaft and when this is done said shaft may be readily removed through the openings 29.

To provide for manipulating the gang of knives the latter is provided with a handle 35. This handle is made integral with one of the spacers 7. By means of this construction the knife may be quickly removed from the knife carrier and when removed it can be easily cleaned by a brush or by any other suitable means.

Figure 6:
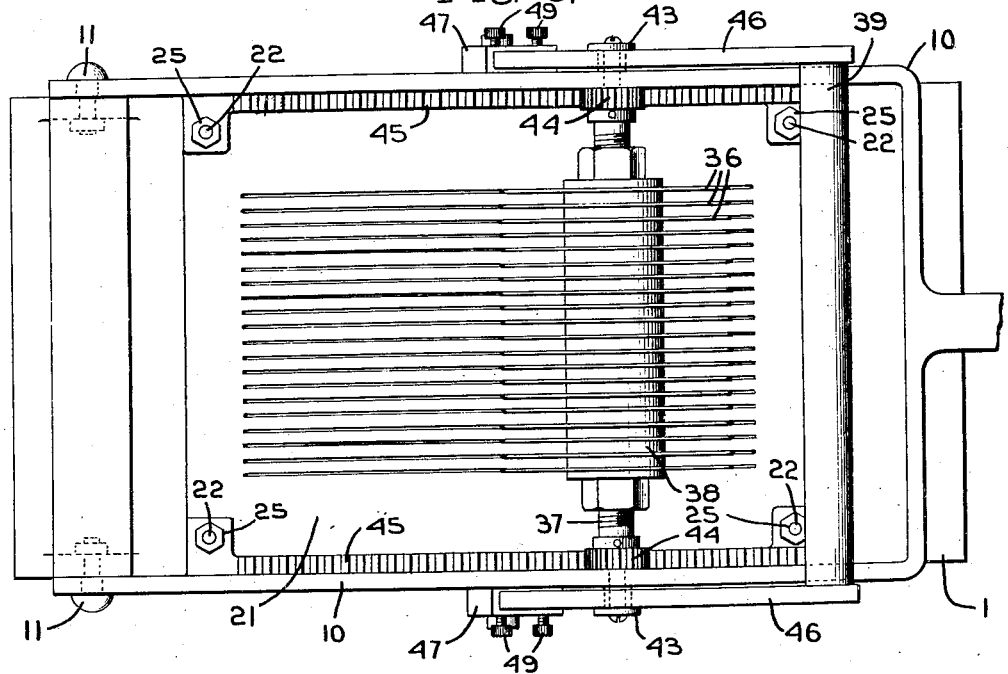
Fig. 6 is a plan view of Fig. 5.

In Figs. 5 and 6 I have illustrated a slightly different embodiment of the invention wherein the knives are in the nature of rotary knives. These knives, which are indicated at 36, are mounted on a shaft 37 and are spaced from each other by suitable spacers 38. The shaft 37 is carried in the knife carrier 10 which is pivoted to the base at 11 all as above described.

The knives are moved back and forth over the steak or other slice of meat 3 by means of an operating member 39 which is a bale-shaped member, the arms of which are pivoted at 40 to ears 41 depending from the knife carrier. Each arm of the member 39 is provided with a slot 42 through which the end of the shaft 37 extends, each shaft end having a washer or collar 43 thereon which engages the outer face of the arm of the member 39.

As the member 39 is swung about its pivot 40 the knives will be rolled back and forth over the meat 3 as will be obvious. I have provided herein means whereby the knives are positively rotated as they move over the meat and at a speed faster than the normal rolling motion of the knives. For this purpose the shaft 37 is provided at each end with a pinion 44 which engages a rack 45 secured to the inner face of the arms of the knife carrier.

With this arrangement the movement of the shaft 37 back and forth in the slot 13 of the knife carrier will operate through the pinions 44 and racks 45 to rotate the knives rapidly so that they will have not only a rolling motion across the meat 3 but will also have a slicing action.

In this embodiment also means are provided to permit the ready removal of the gang of knives from the knife carrier in order to facilitate the cleaning of them. The knife carrier is provided on each side with the opening 29 leading to the slot 30 and each opening is closed by a removable block or filling piece 31 all as shown in Fig. 4.

The knife-actuating member 39 is also specially constructed to permit the knives to be readily removed therefrom. The arms 46 of said member are forked to form the slots 42 and the lower end of each forked arm is detachably secured to a rocker member 47 which is pivoted at 40. This rocker member may be provided with sockets 48 into which the ends of the two brackets of each forked arm 46 are inserted, said brackets being retained in place by set screws 49. With this construction the gang of rotary knives 36 can be readily removed by removing the two filling blocks 30 and then loosening the set screws 49 and withdrawing the actuating member 39 from the blocks 47 and from the shaft 37 of the gang of knives. Said gang of knives may then be moved along the slots 13 until the shaft comes in line with the openings 29 when said gang of knives can be removed through the openings.

It will thus be seen that with my improvements the knives can be readily removed from the frame whenever it is desired to clean them or repair them. It will further be seen that the steak is securely retained in position while it is being acted on by the knives.

While I have illustrated herein some selected embodiments of the invention I do not wish to be limited to the constructional features shown.

I claim:

1. In a device for tendering meat, the combination with a bed, of a knife carrier movable toward and from the bed and comprising two side members each having a slot, a gang of cutting knives slidably mounted in said slots, means to move the gang of knives longitudinally of said slots, each slot having an opening through which the gang of knives may be removed and a removable filler block normally closing each opening.

2. In a device for tendering meat, the combination with a bed, of a knife carrier movable toward and from the bed and provided with guiding slots, a gang of rigidly connected knives provided with extensions which are received in the slots and are adapted to slide longitudinally thereof, each knife having a triangular shape and presenting a pointed cutting edge, and means to move the knives longitudinally of the knife carrier.

3. In a meat tenderer, the combination with a bed having transverse grooves, of a knife carrier movable toward and from the bed, a combined clamping and stripper plate carried by the knife carrier, said plate having transverse ribs which co-operate with said grooves to prevent the meat from slipping, cutting knives movably carried by the knife carrier, and means to give the knives a movement independently of the knife carrier.

4. In a device for tendering meat, the combination with a bed, of a knife carrier movable toward and from the bed and provided with slots, a gang of rotary knives having trunnions extending through said slots, pinions rigid with the trunnions, racks on and movable with the knife carrier with which racks the pinions engage, and means for moving the knives back and forth in the slots, whereby the engagement of the pinions with the racks rotates the knives during such movement.

In testimony whereof, I have signed my name to this specification.

JOSEPH P. SPANG.